(12) United States Patent
Wang et al.

(10) Patent No.: US 11,122,456 B2
(45) Date of Patent: Sep. 14, 2021

(54) METHOD FOR ADJUSTING MOBILITY-RELATED PARAMETERS, A USER EQUIPMENT AND A BASE STATION

(71) Applicant: NTT DOCOMO, INC., Tokyo (JP)

(72) Inventors: Jing Wang, Beijing (CN); Hanning Wang, Beijing (CN); Liu Liu, Beijing (CN); Wuri A. Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/651,118

(22) PCT Filed: Sep. 26, 2018

(86) PCT No.: PCT/CN2018/107570
§ 371 (c)(1),
(2) Date: Mar. 26, 2020

(87) PCT Pub. No.: WO2019/062750
PCT Pub. Date: Apr. 4, 2019

(65) Prior Publication Data
US 2020/0229015 A1    Jul. 16, 2020

(30) Foreign Application Priority Data
Sep. 27, 2017 (CN) ............................ 201710890915

(51) Int. Cl.
*H04W 24/10* (2009.01)
*H04W 36/00* (2009.01)
(Continued)

(52) U.S. Cl.
CPC ........... *H04W 24/10* (2013.01); *H04W 24/02* (2013.01); *H04W 36/0085* (2018.08); *H04W 36/30* (2013.01); *H04W 64/006* (2013.01)

(58) Field of Classification Search
CPC . H04W 24/10; H04W 36/0085; H04W 24/02; H04W 36/30; H04W 64/006
(Continued)

(56) References Cited

U.S. PATENT DOCUMENTS 5,428,816 A * 6/1995 Barnett ........... H04W 36/00835
455/437
2014/0222248 A1   8/2014 Levien et al.
(Continued)

FOREIGN PATENT DOCUMENTS

CN         104160738 A      11/2014

OTHER PUBLICATIONS

International Search Report for corresponding International Application No. PCT/CN2018/107570, dated Dec. 10, 2018 (5 pages).
(Continued)

*Primary Examiner* — Nghi H Ly
(74) *Attorney, Agent, or Firm* — Osha Bergman Watanabe & Burton LLP

(57) ABSTRACT

Provided are a method for adjusting mobility-related parameters performed by a user equipment, a user equipment, a method for adjusting mobility-related parameters performed by a base station or a base station. The method for adjusting mobility-related parameters performed by a user equipment includes: determining a speed and a height of the user equipment; and adjusting mobility-related parameters of the user equipment according to the speed and height. The
(Continued)

method for adjusting mobility-related parameters performed by a base station includes: receiving location information reported by a user equipment; and adjusting mobility-related parameters of the user equipment according to the location information, wherein the location information is reported by the user equipment in response to occurrence of a predetermined event or at a period related to a speed and/or a height of the user equipment.

6 Claims, 3 Drawing Sheets

(51) Int. Cl.
*H04W 24/02* (2009.01)
*H04W 36/30* (2009.01)
*H04W 64/00* (2009.01)

(58) Field of Classification Search
USPC .............. 455/436, 442, 431, 423, 418, 430; 370/331
See application file for complete search history.

(56) References Cited

U.S. PATENT DOCUMENTS

| | | |
|---|---|---|
| 2015/0085650 A1 | 3/2015 | Cui et al. |
| 2016/0112927 A1 | 4/2016 | Cui et al. |
| 2018/0375568 A1* | 12/2018 | De Rosa ............... H04W 72/04 |

OTHER PUBLICATIONS

3GPP TSG-RAN WG1 Meeting #98; R2-1704997 "Mobility enhancement for Drones" Huawei, HiSilicon; Hangzhou, China; May 15-19, 2017 (6 pages).
3GPP TSG-RAN WG2 #101bis; R2-186067 "Mobility Enhancement for UAV UE" NTT Docomo, Inc.; Sanya, China Apr. 16-20, 2018 (3 pages).
3GPP TSG-RAN WG2 Meeting #99; R2-1708545 "Measurement Report Mechanism for Drones" Huawei, HiSilicon Berlin, Germany; Aug. 21-25, 2017 (3 pages).
Partial Supplementary European Search Report issued in European Application No. 18860935.8, dated May 18, 2021 (14 pages).

* cited by examiner

METHOD FOR ADJUSTING MOBILITY-RELATED PARAMETERS, A USER EQUIPMENT AND A BASE STATION

CROSS-REFERENCE TO RELATED APPLICATIONS

This application is a 371 U.S. National Phase of International Application No. PCT/CN2018/107570, filed on Sep. 26, 2018, which claims priority to Chinese Application No. 201710890915.8, filed on Sep. 27, 2017. The entire disclosures of the above applications are incorporated herein by reference.

TECHNICAL FIELD

The present disclosure relates to a field of wireless communication, and in particular to a method for adjusting mobility-related parameters, a user equipment, and a base station that may be used in a wireless communication system including aerial user terminals (such as drones).

BACKGROUND

In recent years, drones (or aerials or UAVs (Unmanned Aerial Vehicles)) have been widely used, and wireless communication networks, such as Long-Term Evolution (LTE) networks, may be used to support drone services due to good performance thereof, for example, to communicate with drones during drone flight, or to support terrestrial controllers/personnel to communicate with drones over wireless networks. Herein, a user terminal, such as a drone, capable of flying in the air and communicating with a base station through a wireless communication network may be referred to as an aerial user terminal.

Compared with a terrestrial user terminal, an aerial user terminal tends to move faster, so it may switch among cells more frequently. In addition, since the aerial user terminal flies in the air, the aerial user terminal encounters fewer obstacles than a terrestrial user terminal, and therefore the aerial user terminal may receive signals from more base stations. Due to these characteristics of the aerial user terminal, if the same mobility management methods as ordinary user terminals (terrestrial user terminals) are applied to the aerial user terminal, performance of the aerial user terminal will be reduced. For example, the aerial user terminal may perform unnecessary measurements for some cells, and reliability and efficiency of communication between the aerial user terminal and base stations are reduced due to frequent handover.

Therefore, mobility management for aerial user terminals needs to be enhanced.

SUMMARY OF THE DISCLOSURE

According to one embodiment of the present disclosure, a method for adjusting mobility-related parameters performed by a user equipment is provided, comprising: determining a speed and a height of the user equipment; adjusting mobility-related parameters of the user equipment according to the speed and the height.

According to another embodiment of the present disclosure, a user equipment is provided, comprising: a determining unit configured to determine a speed and a height of the user equipment; an adjusting unit configured to adjust mobility-related parameters of the user equipment according to the speed and the height.

According to another embodiment of the present disclosure, a method for adjusting mobility-related parameters performed by a base station is provided, comprising: receiving location information reported by a user equipment; adjusting mobility-related parameters of the user equipment according to the location information, wherein the location information is reported by the user equipment in response to occurrence of a predetermined event or at a period related to a speed and/or a height of the user equipment.

According to another embodiment of the present disclosure, a base station is provided, comprising: a receiving unit configured to receive location information reported by a user equipment; an adjusting unit configured to adjust mobility-related parameters of the user equipment according to the location information, wherein the location information is reported by the user equipment in response to occurrence of a predetermined event or at a period related to a speed and/or a height of the user equipment.

BRIEF DESCRIPTION OF THE DRAWINGS

The above and other objects, features and advantages of the present disclosure will become more apparent by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

DESCRIPTION OF THE EMBODIMENTS

In order to make objectives, technical solutions and advantages of the present disclosure more apparent, exemplary embodiments according to the present disclosure will be described in detail below with reference to the accompanying drawings.

First, a wireless communication system in which the embodiments of the present disclosure may be applied will be described with reference to FIG. 1. The wireless communication system may be a LTE system or any other type of wireless communication system. Hereinafter, the embodiments of the present disclosure will be described by using the LTE system as an example. However, it should be appreciated that the following description may also be applied to other types of wireless communication systems.

Figure 1:
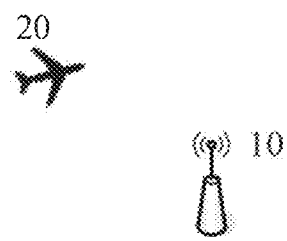
FIG. 1 is a schematic diagram of a wireless communication system in which the embodiments of the present disclosure may be applied.

As shown in FIG. 1, the wireless communication system includes a base station (BS) 10 and a user equipment (UE) 20. The user equipment 20 may be an aerial vehicle (AV) capable of flying in the air and communicating with the base station 10, such as a drone (or UAV, such as a drone based on the Rel. 15 of 3GPP specification). Herein, a user equipment or user terminal capable of flying in the air and communicating wirelessly with a base station is referred to as an aerial user terminal (UT), and the aerial user terminal may also be interchangeably referred to as an aerial user equipment, an air user terminal, an air user equipment and the like. It should be appreciated that although one base station and one aerial user terminal are shown in FIG. 1, this is only schematic, and the wireless communication system may include a plurality of base stations and/or a plurality of aerial user terminals. In addition, the wireless communication system may also include one or more user equipment or terminals (not shown) that are not aerial user terminals, that is, terrestrial user equipment or terminals.

In the LTE system, when the user terminal is in an idle state and it is necessary to determine whether cell reselection is required, the user terminal measures signal quality $Q_s$ of a serving cell and signal quality $Q_n$ of a neighboring cell. The signal quality may be represented by, for example, Reference Signal Received Quality (RSRQ), a Reference Signal Received Power (RSRP), and the like. If the signal quality $Q_n$ of the neighboring cell is greater than the signal received quality $Q_s$ of the serving cell by more than a predetermined hysteresis value $Q_{hyst}$ for a predetermined time (cell reselection hysteresis time $T_{reselection}$), the user terminal determines that cell reselection may be performed, and thus selects a target cell to reside on the cell.

Furthermore, in the LTE system, for a user terminal in a connected state, a series of Radio Resource Management (RRM) measurement events A1-A6, B1-B2, C1-C2, and the like are defined. For example, when event A1 occurs, the user equipment stops inter-frequency/inter-system cell measurement and transmits an A1 event measurement report to the base station, where the event A1 is that the signal quality Ms of the serving cell is greater than a threshold $T_{hresh}$ by a hysteresis value $H_{ys}$. When event A2 occurs, the user equipment starts inter-frequency/inter-system cell measurement and transmits an A2 event measurement report to the base station, where the event A2 is that the signal quality Ms of the serving cell is smaller than the threshold $T_{hresh}$ by the hysteresis value $H_{ys}$. When event A3 occurs and lasts for a period of trigger time (TimeToTrigger), the user equipment transmits an A3 event measurement report to the base station to start an intra-frequency cell handover process, where the event A3 is:

$$M_n+O_{fn}+O_{cn}-H_{ys}>M_p+O_{fp}+O_{cp}+O_{ff}$$

where $M_n$ is the signal quality of the neighboring cell, $O_{fn}$ is a frequency-specific offset value of the neighboring cell, $O_{cn}$ is a cell-specific offset value of the neighboring cell, $M_p$ is signal quality of a primary cell ($P_{cell}$) of the serving cell, $O_{fp}$ is a frequency-specific offset value of the primary cell, $O_{cp}$ is a cell-specific offset value of the primary cell, $H_{ys}$ is the hysteresis value, and $O_{ff}$ is an offset value for the event A3. When event A4 occurs, the user equipment transmits an A4 event measurement report to the base station, where the event A4 is that the signal quality of the neighboring cell is greater than the threshold $T_{hresh}$ by the hysteresis value $H_{ys}$. Definitions of related events may be found in the 3GPP specification TS36.331 (for example, TS36.331 v14.4.0), which will not be repeatedly described herein.

Various parameters are defined in the respective events described above, including hysteresis values $Q_{hyst}$ and $H_{ys}$, cell reselection hysteresis time $T_{reselection}$, trigger time TimeToTrigger and so on, all of which belong to mobility-related parameters used for mobility management for the user equipment.

In a first embodiment of the present disclosure, mobility-related parameters of aerial user terminals are optimized according to their characteristics to solve the problems mentioned above. It should be noted that, although descriptions are made below with respect to the aerial user terminals, in fact, the following embodiments may also be applied to some terrestrial user terminals, such as user terminals carried by users to high places. Therefore, the following embodiments actually may be applied to user terminals or user equipment including aerial user terminals and terrestrial user terminals.

A method for adjusting mobility-related parameters by a user equipment according to the first embodiment of the present disclosure will be described below with reference to FIG. 2. The user equipment may be, for example, the aerial user terminal 20 shown in FIG. 1.

Figure 2:
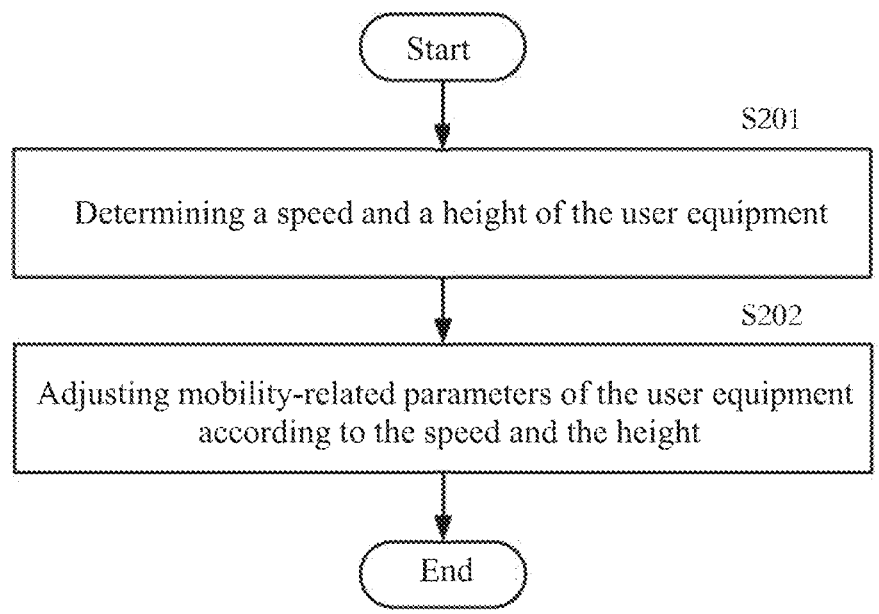
FIG. 2 is a flowchart of a method for adjusting mobility-related parameters by a user equipment according to a first embodiment of the present disclosure.

As shown in FIG. 2, in step S201, a speed and a height of the aerial user terminal 20 are determined.

In a first implementation, the height of the aerial user terminal 20 may be determined by using a height sensor in the aerial user terminal 20 and/or a height estimation algorithm. Furthermore, the speed of the aerial user terminal 20 may be determined by using a speed sensor in the aerial user terminal 20 and/or a speed estimation algorithm.

In a second implementation, the height of the aerial user terminal 20 may be determined by using a height sensor in the aerial user terminal 20 and/or a height estimation algorithm. Furthermore, the speed of the aerial user terminal 20 may be determined according to a frequency of cell reselection or handover performed by the aerial user terminal 20. Specifically, the aerial user terminal 20 may move from one cell to another cell during flight. Accordingly, if the aerial user terminal 20 is in an idle (RRC_Idle) state, the aerial user terminal 20 needs to perform cell reselection in response to the change of the location of the aerial user terminal 20; or if the aerial user terminal 20 is in a connected (RRC_Connected) state, the aerial user terminal 20 needs to perform cell handover in response to the change of the location of the aerial user terminal 20. It is conceivable that the faster the aerial user terminal 20 is, the greater number of times the aerial user terminal 20 performs cell reselection or cell handover within a predetermined period of time. Therefore, for the aerial user terminal 20 in the idle state, the number of times of cell reselection performed by the aerial user terminal 20 within a predetermined period of time may be calculated as a metric of its speed, and for the aerial user terminal 20 in the connected state, the number of times of cell handover performed by the aerial user terminal 20 within a predetermined period of time may be calculated as a metric of its speed.

Referring to FIG. 2 again, in step S202, the mobility-related parameters of the aerial user terminal 20 may be adjusted according to the speed and the height.

As described above, the mobility-related parameters may include parameters related to mobility management used in various events defined in the 3GPP specification TS36.331, such as the hysteresis values $Q_{hyst}$ and $H_{ys}$, cell reselection hysteresis time $T_{reselection}$, trigger Time TimeToTrigger and the like. However, it should be appreciated that the mobility-related parameters are not limited to the parameters described above. In fact, the mobility-related parameters may include any parameters related to mobility management for the user equipment/user terminal, including parameters related to mobility management involved in the above defined events and events that may be defined in the future. In the following, to facilitate description, the cell reselection hysteresis time $T_{reselection}$ and the trigger time TimeToTrigger are taken as examples of mobility-related parameters, but the following description is also applicable to other mobility-related parameters. Furthermore, initial values of the adjusted mobility-related parameter may be, for example, values configured for an ordinary user terminal (terrestrial user terminal) or other values.

In the first implementation, the mobility-related parameters of the aerial user terminal 20 are adjusted according to the speed and the height of the aerial user terminal 20, respectively. For example, a speed-related scaling factor and a height-related scaling factor may be set respectively, and the mobility-related parameters are scaled by using these two scaling factors, respectively.

Different values may be assigned to the speed-related scaling factor according to the speed of the aerial user terminal 20, in order to use the speed-related scaling factor to scale the mobility-related parameters.

For example, one or more speed thresholds may be set in advance to distinguish speed-related mobility states of the aerial user terminal 20, such as a high-speed mobility state, a medium-speed mobility state, or a low-speed mobility state. Accordingly, for each mobility state, a corresponding value may be set for the speed-related scaling factor, such as a value of SFS1 corresponding to the high-speed mobility state, a value of SFS2 corresponding to the medium-speed mobility state, and a value of SFS3 corresponding to the low-speed mobility state, so that when the aerial user terminal 20 is in a certain mobility state, the mobility-related parameters, such as the cell reselection hysteresis time $T_{reselection}$ or the trigger time TimeToTrigger, may be scaled by using the speed-related scaling factor having a value corresponding to the mobility state. For example, two speed thresholds TS1 and TS2 may be set, where TS1 is greater than TS2. It should be noted that if a normal absolute speed (for example, m/s) is used to measure the speed of the aerial user terminal 20, the thresholds may be absolute speed thresholds. If the number of times of cell reselection or the number of times of cell handover described above is used to measure the speed of the aerial user terminal 20, the thresholds may be thresholds for the number of times of cell reselection or thresholds for the number of times of cell handover. In this case, if the speed of the aerial user terminal 20 is greater than the first threshold TS1, it may be determined that the aerial user terminal 20 is in the high-speed mobility state, and thus the mobility-related parameters are scaled by using the speed-related scaling factor having the value of SFS1. If the speed of the aerial user terminal 20 is not greater than the first threshold TS1, but greater than the second threshold TS2, it may be determined that the aerial user terminal 20 is in the medium-speed mobility state, and thus the mobility-related parameters are scaled by using the speed-related scaling factor having the value of SFS2. On the other hand, if the speed of the aerial user terminal 20 is not greater than TS2, it may be determined that the aerial user terminal 20 is in the low-speed mobility state, and thus the mobility-related parameters are scaled by using the speed-related scaling factor having the value of SFS3. As an example, SFS1 may be greater than SFS2, and SFS2 may be greater than SFS3. However, in fact, SFS1, SFS2, SFS3 and relative sizes thereof may be set according to actual needs. For example, SFS3 may be set to 1, and SFS1 and SFS2 may be set accordingly. Alternatively, SFS3 may not be set for the low-speed mobility state, which means that when the aerial user terminal 20 is in the low-speed mobility state, the mobility-related parameters are not scaled according to its speed. It should be appreciated that the above-mentioned manner of setting two thresholds to divide mobility states of the aerial user terminal 20 into three mobility states and thereby setting three values (SFS1-SFS3) of the speed-related scaling factor is merely exemplary, and more or less thresholds may be set to divide mobility states of the aerial user terminal 20 into more or less mobility states, and thereby setting more or less values of the speed-related scaling factor.

Furthermore, different values may be assigned to the height-related scaling factor according to the height of the aerial user terminal 20, in order to further scale the mobility-related parameters by using the height-related scaling factor.

For example, one or more height variation thresholds may be set in advance to distinguish height-related mobility states of the aerial user terminal 20 in terms of height, such as a high-height-related mobility state, a medium-height-related mobility state, or a low-height-related mobility state. Accordingly, for each height-related mobility state, a corresponding value may be set for the height-related scaling factor, such as a value of SFH1 corresponding to the high-height-related mobility state, a value of SFH2 corresponding to the medium-height-related mobility state, and a value of SFH3 corresponding to the low-height-related mobility state, so that when the aerial user terminal 20 is in a certain height-related mobility state, the mobility-related parameters, such as the cell reselection hysteresis time $T_{reselection}$ or the trigger time TimeToTrigger, may be (further) scaled by using the height-related scaling factor having a value corresponding to the height-related mobility state. For example, two height variation thresholds TH1 and TH2 may be set, where TH1 is greater than TH2. If a height variation of the aerial user terminal 20 in a predetermined period of time ($T_{height}$) is greater than the first threshold TH1, it may be determined that the aerial user terminal 20 is in the high-height-related mobility state, and thus the mobility-related parameters are scaled by using the height-related scaling factor having the value of SFH1. If the height variation of the aerial user terminal 20 in a predetermined period of time is not greater than the first threshold TH1, but greater than the second threshold TH2, it may be determined that the aerial user terminal 20 is in the medium-height-related mobility state, and thus the mobility-related parameters are scaled by using the height-related scaling factor having the value of SFH2. On the other hand, if the height variation of the aerial user terminal 20 is not greater than TH2, it may be determined that the aerial user terminal 20 is in the low-height-related mobility state, and thus the mobility-related parameters are scaled by using the height-related scaling factor having the value of SFH3. As an example, SFH1 may be greater than SFH2, and SFH2 may be greater than SFH3. However, in fact, SFH1, SFH2, SFH3 and relative sizes thereof may be set according to actual needs. For example, SFH3 may be set to 1, and SFH1 and SFH2 may be set accordingly. Alternatively, SFH3 may not be set for the low-height-related mobility state, which means that when the aerial user terminal 20 is in the low-height-related mobility state, the mobility-related parameters are not scaled according to its height. It should be appreciated that the above-mentioned manner of setting two thresholds to divide mobility states of the aerial user terminal 20 into three height-related mobility states and thereby setting three values of the height-related scaling factor is merely exemplary, and more or less thresholds may be set to divide mobility states of the aerial user terminal 20 into more or less height-related mobility states, and thereby setting more or less values of the height-related scaling factor.

In this way, according to the speed and the height of the aerial user terminal 20, the mobility-related parameters may be multiplied by the speed-related scaling factor having a value corresponding to the speed, and then multiplied by the height-related scaling factor having a value corresponding to the height, to scale the mobility-related parameters. It should be appreciated that the order in which the two scaling factors are used to scale the mobility-related parameters is not limited. In addition, the way to use these two scaling factors to scale the mobility-related parameters is not limited to multiplication, but also may be power and the like, which may be flexibly selected according to specific conditions of the wireless communication system and the aerial user terminal 20.

In the second implementation, the mobility-related parameters of the aerial user terminal 20 may be jointly adjusted according to the speed and the height of the aerial user terminal 20. For example, a single scaling factor related to both the speed and the height of the aerial user terminal may be set, and the mobility-related parameters may be scaled by using the single scaling factor.

As an example, as described above for the first implementation, one or more speed thresholds may be set in advance to distinguish the speed-related mobility states (assuming that there is N1 states) of the aerial user terminal 20, and one or more height variation thresholds may be set to distinguish the height-related mobility states (assuming that there is N2 states) of the aerial user terminal 20. A single scaling factor may be set, where the scaling factor has a corresponding value for each of the N1*N2 mobility state combinations of the N1 speed-related mobility states and the N2 height-related mobility states. In this way, according to the speed-related mobility states and the height-related mobility states of the aerial user terminal 20, it may be determined that the scaling factor having a corresponding value is used to scale the mobility-related parameters.

For example, in the example used when describing the first implementation, the speed-related mobility states of the aerial user terminal 20 are divided into three, that is, the high-speed mobility state, the medium-speed mobility state, or the low-speed mobility state, and the height-related mobility states of the aerial user terminal 20 are divided into three, that is, the high-height-related mobility state, the medium-height-related mobility state, or the low-height-related mobility state. Therefore, there may be 9 mobility state combinations, and for each mobility state combination, a corresponding value is set for the scaling factor, as shown in Table 1 below. Therefore, according to the speed-related mobility states and the height-related mobility states of the aerial user terminal 20, a corresponding one value of the nine values of the scaling factor may be used to scale the mobility-related parameters (for example, the mobility-related parameters may be multiplied by the corresponding one value).

TABLE 1

|  | High-speed mobility state | Medium-speed mobility state | Low-speed mobility state |
| --- | --- | --- | --- |
| High-height-related mobility state | SF1 | SF2 | SF3 |
| Medium-height-related mobility state | SF4 | SF5 | SF6 |
| Low-height-related mobility state | SF7 | SF8 | SF9 |

In both of the above implementations, two factors, the speed and the height, are considered to adjust the mobility related parameters. In the first implementation manner, the parameters are adjusted by using the speed-related scaling factor and the height-related scaling factor, respectively. Thus, if two aerial user terminals have the same height-related mobility state, height-related scaling factors applied to the two terminals are the same, which means that effect of the height on the adjusted parameters is the same. The same goes for the speed. In contrast, in the second implementation, the parameters are adjusted by using the single scaling factor related to both the speed and the height. Thus, even if two aerial user terminals have the same height-related mobility state, different values of the scaling factor may be set such that effect of the height on the adjusted parameters may be the same or different. The same goes for the speed.

A structure of a user terminal according to the first embodiment of the present disclosure will be described below with reference to FIG. 3. As described above, the user terminal may be an aerial user terminal or a terrestrial user terminal. Herein, the aerial user terminal 20 is used as an example for description. Since functions of the user terminal are the same as the details of the method described above with reference to FIG. 2, detailed description of the same content is omitted herein for simplicity.

Figure 3:
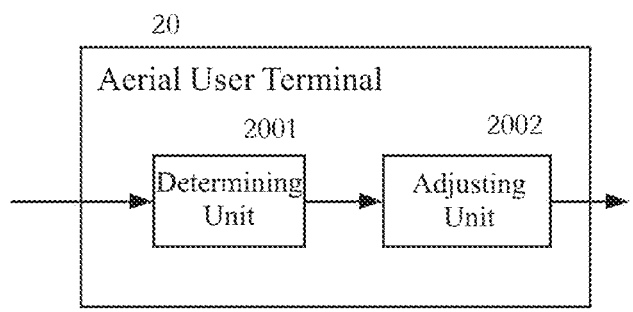
FIG. 3 is a block diagram of a user equipment according to the first embodiment of the present disclosure.

As shown in FIG. 3, the aerial user terminal 20 comprises a determining unit 2001 and an adjusting unit 2002. It should be noted that although only two units of the aerial user terminal 20 are shown in FIG. 3, this is only schematic, and the aerial user terminal 20 may further comprise one or more other units, which are omitted because they are not related to the inventive concept.

The determining unit 2001 determines a speed and a height of the aerial user terminal 20.

In a first implementation, the determining unit 2001 may determine the height of the aerial user terminal 20 by using a height sensor in the aerial user terminal 20 and/or a height estimation algorithm. Furthermore, the determining unit 2001 may determine the speed of the aerial user terminal 20 by using a speed sensor in the aerial user terminal 20 and/or a speed estimation algorithm.

In a second implementation, the determining unit 2001 may determine the height of the aerial user terminal 20 by using a height sensor in the aerial user terminal 20 and/or a height estimation algorithm. Furthermore, the determining unit 2001 may determine the speed of the aerial user terminal 20 according to a frequency of cell reselection or handover performed by the aerial user terminal 20. Specifically, as described above, for the aerial user terminal 20 in the idle state, the determining unit 2001 may calculate the number of times of cell reselection performed by the aerial user terminal 20 within a predetermined period of time as a metric of its speed, and for the aerial user terminal 20 in the connected state, the determining unit 2001 may calculate the number of times of cell handover performed by the aerial user terminal 20 within a predetermined period of time as a metric of its speed.

The adjusting unit 2002 may adjust the mobility-related parameters of the aerial user terminal 20 according to the speed and the height determined by the determining unit 2001.

As described above, the mobility-related parameters may include parameters related to mobility management used in various events defined in the 3 GPP specification TS36.331, and in fact, may include any parameters related to mobility management for the aerial user terminal 20, including parameters related to mobility management involved in the above defined events and events that may be defined in the future. Furthermore, initial values of the adjusted mobility-related parameter may be, for example, values configured for a terrestrial user terminal or other values.

In the first implementation, the adjusting unit 2002 may adjust the mobility-related parameters of the aerial user terminal 20 according to the speed and the height of the aerial user terminal 20, respectively. For example, the adjusting unit 2002 may set a speed-related scaling factor and a height-related scaling factor, respectively, and scale the mobility-related parameters by using these two scaling factors, respectively.

The adjusting unit 2002 may assign different values to the speed-related scaling factor according to the speed of the aerial user terminal 20, in order to use the speed-related scaling factor to scale the mobility-related parameters. For example, one or more speed thresholds may be set in advance to distinguish speed-related mobility states of the aerial user terminal 20, such as a high-speed mobility state, a medium-speed mobility state, or a low-speed mobility state. Accordingly, for each mobility state, the adjusting unit 2002 may set a corresponding value for the speed-related scaling factor, such as a value of SFS1 corresponding to the high-speed mobility state, a value of SFS2 corresponding to the medium-speed mobility state, and a value of SFS3 corresponding to the low-speed mobility state, so that when the aerial user terminal 20 is in a certain mobility state, the mobility-related parameters, such as the cell reselection hysteresis time $T_{reselection}$ or the trigger time TimeToTrigger, may be scaled by using the speed-related scaling factor having a value corresponding to the mobility state.

Furthermore, the adjusting unit 2002 may assign different values to the height-related scaling factor according to the height of the aerial user terminal 20, in order to further scale the mobility-related parameters by using the height-related scaling factor. For example, one or more height variation thresholds may be set in advance to distinguish height-related mobility states of the aerial user terminal 20 in terms of height, such as a high-height-related mobility state, a medium-height-related mobility state, or a low-height-related mobility state. Accordingly, for each height-related mobility state, the adjusting unit 2002 may set a corresponding value for the height-related scaling factor, such as a value of SFH1 corresponding to the high-height-related mobility state, a value of SFH2 corresponding to the medium-height-related mobility state, and a value of SFH3 corresponding to the low-height-related mobility state, so that when the aerial user terminal 20 is in a certain height-related mobility state, the mobility-related parameters, such as the cell reselection hysteresis time $T_{reselection}$ or the trigger time TimeToTrigger, may be (further) scaled by using the height-related scaling factor having a value corresponding to the height-related mobility state.

In this way, according to the speed and the height of the aerial user terminal 20, the adjusting unit 2002 may multiply the mobility-related parameters by the speed-related scaling factor having a value corresponding to the speed, and then by the height-related scaling factor having a value corresponding to the height, to scale the mobility-related parameters. It should be appreciated that the order in which the two scaling factors are used to scale the mobility-related parameters is not limited. In addition, the way to use these two scaling factors to scale the mobility-related parameters is not limited to multiplication, but also may be power and the like, which may be flexibly selected according to specific conditions of the wireless communication system and the aerial user terminal 20.

In the second implementation, the adjusting unit 2002 may jointly adjust the mobility-related parameters of the aerial user terminal 20 according to the speed and the height of the aerial user terminal 20. For example, the adjusting unit 2002 may set a single scaling factor related to both the speed and the height of the aerial user terminal, and scale the mobility-related parameters by using the single scaling factor.

As an example, as described above for the first implementation, the adjusting unit 2002 may set one or more speed thresholds in advance to distinguish the speed-related mobility states (assuming that there is N1 states) of the aerial user terminal 20, and may set one or more height variation thresholds to distinguish the height-related mobility states (assuming that there is N2 states) of the aerial user terminal 20. A single scaling factor may be set, where the scaling factor has a corresponding value for each of the N1*N2 mobility state combinations of the N1 speed-related mobility states and the N2 height-related mobility states. In this way, according to the speed-related mobility states and the height-related mobility states of the aerial user terminal 20, the adjusting unit 2002 may determine that the scaling factor having a corresponding value is used to scale the mobility-related parameters.

Therefore, the aerial user terminal 20 may adjust the mobility-related parameters according to its own speed and height, and manage its own mobility according to the adjusted mobility-related parameters, thereby controlling the frequency of cell measurement, cell reselection or cell handover, avoiding unnecessary cell measurement performed by the aerial user terminal, and avoiding reduction in reliability and efficiency of communication between the aerial user terminal and base stations due to frequent handover. Furthermore, the aerial user terminal 20 may also transmit the adjusted parameters to a base station if needed, so that the base station manages mobility of the aerial user terminal 20 based on the parameters.

It should be appreciated that the embodiment described above are illustrative only and not limitative. For example, as described above, the method for adjusting the mobility-related parameters is not limited to scaling or multiplication, and other methods such as power and the like may also be used. Furthermore, although a scaling factor is set for each height-related mobility state or speed-related mobility state above, this is not limitative, and it is possible to not set a scaling factor (equivalent to a scaling factor of 1) for some states (below the low-speed state or the low-height-related mobility state).

A second embodiment of the present disclosure will be described below. Different from the first embodiment, in the second embodiment, the mobility-related parameters used for mobility management for the aerial user terminal 20 are adjusted by a base station. To this end, the aerial user terminal 20 needs to report its location information (for example, including at least one of a height and a speed of the aerial user terminal 20, the speed including at least one of a horizontal speed and a vertical speed, for example) to the base station, so that the base station can adjust the mobility-related parameters according to the location information.

In the LTE system, a user equipment periodically reports the location information of the user equipment (only applicable to a primary cell PCell). The location information may include one or more of location coordinates (including the height) of the aerial user terminal 20, the (horizontal) speed of the aerial user terminal 20, and a valid time (Gnss-Tod-msec) of the location information, and the like. The content of the location information may be flexibly adjusted as needed, and may include any information related to the location of the user equipment. Specifically, the base station transmits RRM measurement configuration information to the user equipment, where the measurement configuration information includes a measurement ID, a measurement object and a report configuration. The measurement object is, for example, a frequency or carrier, a cell and/or a cell group to be measured. The report configuration includes, for example, a report criterion (periodic or event-triggered), a format of a measurement report (such as the content the measurement report should contain), and so on. Furthermore, the report configuration may further include content related to a location report, such as indicating whether to perform a location report and a format of the location report. When the location report is configured in the report configuration, the user equipment periodically transmits location information to the base station, and also transmits a measurement report for the PCell along with the location information. In this case, if the period is not set properly, this periodically reported location information might become outdated and lose accuracy. Then, if the mobility related parameters are adjusted based on this inaccurate location information, performance of the mobility management will be reduced.

The second embodiment of the present disclosure can avoid the above problems by triggering a report of location information based on an event, or by reasonably setting a period for location information report according to the speed and/or the height of the aerial user terminal 20. The second embodiment of the present disclosure will be described below with reference to the accompanying drawings.

Figure 4:
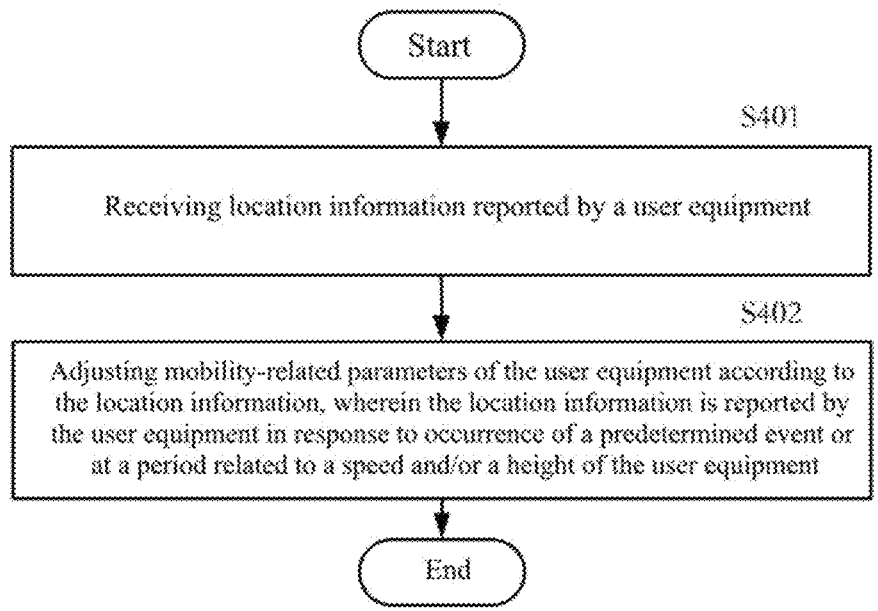
FIG. 4 is a flowchart of a method for adjusting mobility-related parameters by a base station according to a second embodiment of the present disclosure.

FIG. 4 shows a flowchart of a method for adjusting mobility-related parameters by a base station according to the second embodiment of the present disclosure. The method is described below by taking the base station 10 shown in FIG. 1 as an example. Likewise, the method may be applied to an aerial user terminal and a terrestrial user terminal. Herein, an aerial user terminal is taken as an example for description.

As shown in FIG. 4, in step S401, the base station 10 may receive location information reported by an aerial user terminal. As described above, the location information reported by the aerial user terminal may include one or more of location coordinates of the aerial user terminal 20 (such as a height, or a height and other location coordinates), a speed of the aerial user terminal 20 (such as, at least one of a horizontal speed and a vertical speed), a valid time (Gnss-Tod-msec) of the location information, and the like, or may include any other information related to the location of the aerial user terminal 20.

In a first implementation, the location information is reported by the aerial user terminal 20 in response to occurrence of a predetermined event. The predetermined event may be any suitable condition determined as needed.

In one example, the predetermined event may be defined based on the speed of the aerial user terminal 20. For example, a predetermined event X1 may be defined, such that if a difference between the speed V of the aerial user terminal 20 and a speed threshold $T_{v1}$ exceeds a hysteresis value $H_{ys1}$, that is, $V-H_{ys1}>T_{v1}$, the event X1 occurs, and at this time, the report of the location information may be triggered. Alternatively, a predetermined event X2 may be defined, such that if a difference between a speed variation (an increase amount or a decrease amount of the speed) ΔV of the aerial user terminal 20 within a predetermined period of time and a speed variation threshold value $T_{\Delta v1}$ exceeds a hysteresis value $H_{ys2}$, that is, ΔV-Hys2>$T_{\Delta v1}$, the event X2 occurs, and at this time, the report of the location information may be triggered.

In another example, the predetermined event may be defined based on the height of the aerial user terminal 20. For example, a predetermined event Y1 may be defined, such that if a difference between the height H of the aerial user terminal 20 and a height threshold $T_{H1}$ exceeds a hysteresis value $H_{ys3}$, that is, $H-H_{ys3}>T_{H1}$, the event Y1 occurs, and at this time, the report of the location information may be triggered. Alternatively, a predetermined event Y2 may be defined, such that if a difference between a height variation (an increase amount or a decrease amount of the height) ΔH of the aerial user terminal 20 within a predetermined period of time and a height variation threshold value TATE exceeds a hysteresis value $H_{ys4}$, that is, ΔH-Hys4>$T_{\Delta H1}$, the event Y2 occurs, and at this time, the report of the location information may be triggered. Of course, when an event based on the height of the aerial user terminal occurs, other reports, such as a RRM measurement report may be triggered in addition to the report of the location information.

In another example, the predetermined event may be defined based on both the speed and the height of the aerial user terminal 20. For example, a predetermined event Z1 may be defined, such that if a difference between the speed V of the aerial user terminal 20 and a speed threshold $T_{v2}$ exceeds a hysteresis value $H_{ys5}$, that is, $V-H_{ys5}>T_{v2}$, and a difference between the height H of the aerial user terminal 20 and a height threshold TH2 exceeds a hysteresis value $H_{ys6}$, that is, $H-H_{ys6}>T_{H2}$, the event Z1 occurs, and at this time, the report of the location information may be triggered. Alternatively, a predetermined event Z2 may be defined, such that if a difference between a speed variation (an increase amount or a decrease amount of the speed) ΔV of the aerial user terminal 20 within a predetermined period of time and a speed variation threshold $T_{\Delta v2}$ exceeds a hysteresis value $H_{ys7}$, that is, $\Delta V-H_{ys7}>T_{\Delta v2}$, and a difference between a height variation (an increase amount or a decrease amount of the height) ΔH of the aerial user terminal 20 within a predetermined period of time and a height variation threshold $T_{\Delta H2}$ exceeds a hysteresis value $H_{ys8}$, that is, $\Delta H-H_{ys8}>T_{\Delta H2}$, the event Z2 occurs, and at this time, the report of the location information may be triggered.

In another example, the predetermined event may be defined based on the speed and the height of the aerial user terminal 20 respectively, such that when both the predetermined event based on the speed and the predetermined event based on the height occur, the report of the location information may be triggered. For example, the predetermined event defined based on the speed may be the above event X1, and the predetermined event defined based on the height may be the above event Y1, such that when both the events X1 and Y1 occur, the report of the location information may be triggered. It should be appreciated that the above respective thresholds and hysteresis values may be set to be the same or different.

In another example, the predetermined event is defined based on the number of cells that trigger an event related to RRM measurement within a predetermined period of time.

Specifically, as described above, a plurality of events related to RRM measurement are defined in the LTE system, such as the events A1-A6 and the like. When the aerial user terminal is flying, the higher the height, the more cells from which the aerial user terminal may receive signals, and accordingly, the higher the probability that the event (such as event A3) will be triggered, in other words, the event will be triggered in more cells. Therefore, the greater the number of cells in which the event related to RRM measurement is triggered within the predetermined period of time, the higher the height of the aerial user terminal, and therefore, there is a greater need to report the location information of the aerial user terminal. Therefore, a new event Xx may be defined, such that if the number of cells in which the event related to RRM measurement is triggered within the predetermined period of time is greater than N, the event Xx occurs, and at this time, the report of the location information may be triggered. Certainly, when the number of cells in which the event related to RRM measurement is triggered reaches a preset condition within the predetermined period of time, other reports, such as a RRM measurement report, may be triggered in addition to the report of the location information.

In a second implementation, the location information is reported by the aerial user terminal at a period related to the speed and/or the height of the aerial user terminal.

As described above, in LTE, the location information is reported at a period configured by the base station. In this case, there may be a problem that the reported location information is out of date due to an inappropriate period setting. In this implementation, the aerial user terminal may adjust, according to its own speed and/or height, a reporting period by using a scaling factor based on a fixed period configured by the base station, or set a reporting period (instead of a fixed period configured by the base station) according to its own speed and/or height, and report the location information at the adjusted or set period. For example, the period may be adjusted or set such that the greater the speed of the aerial user terminal or the greater the speed variation over a period of time, the shorter the period. Alternatively, the period may be set such that the higher the height of the aerial user terminal, or the greater the height variation over a period of time, the shorter the period. In this way, since the reporting period for the location information is associated with the mobility state of the aerial user terminal, the reported location information is more accurate.

Furthermore, in this embodiment, the location information may be reported separately. That is, it is not necessary to report the location information together with a RRM measurement report. Specifically, the base station may transmit to the aerial user terminal configuration information only for the location information report, where the configuration information may include the measurement object, the measurement ID, and the report configuration for the location information as described above. The report configuration may include a trigger type (periodic or event-triggered) for the location information report and a format (i.e., content contained in the location information report) of the location information report. When the trigger type for the location information report is periodically triggered, the aerial user terminal may transmit the location information to the base station at the period as described above. When the trigger type for the report is event-triggered, the aerial user terminal may transmit the location information to the base station in the manner as described above when the predetermined event occurs.

Alternatively, the location information may also be reported together with a RRM measurement report instead of being reported separately. As described above, in LTE, the base station transmits RRM measurement configuration information to the aerial user terminal, where the measurement configuration information includes a measurement ID, a measurement object, and a report configuration. The measurement object is, for example, a frequency or carrier, a cell and/or a cell group to be measured. The report configuration includes, for example, a report criterion (periodic or event-triggered) and a format of the measurement report, and may further include content related to the location report. Content related to the location report in the report configuration may be modified, such that the report configuration further includes a trigger type (periodic or event-triggered) for the location information report and a format (i.e., content contained in the location information report) of the location information report. Thus, when the trigger type for the information report is periodically triggered, the aerial user terminal may transmit the location information to the base station together with the RRM measurement report at the period as described above; and when the trigger type for the report is event-triggered, the aerial user terminal may transmit the location information to the base station together with the RRM measurement report in the manner as described above when the predetermined event occurs. For example, the location information may be included in the RRM measurement report, such that that the location information is transmitted to the base station together with the RRM measurement report. Alternatively, the location information and the RRM measurement report may be transmitted to the base station together and independently of each other. Therefore, the report of the location information and/or the transmission of the RRM measurement report may be triggered by the predetermined event.

Referring to FIG. 4 again, in step S402, the base station 10 may adjust the mobility-related parameters of the aerial user terminal according to the location information.

Specifically, the base station 10 may adjust the mobility-related parameters of the aerial user terminal according to the location information in any suitable manner. For example, the base station 10 may adjust (scale) the mobility-related parameters according to the height and speed information in the location information by using the method for adjusting the mobility-related parameters according to the first embodiment of the present disclosure, which will not be repeatedly described herein. Alternatively, the base station 10 may adjust the mobility-related parameters of the aerial user terminal according to the location information in a manner known in the art.

Therefore, the base station may obtain the location information of the aerial user terminal in time, and adjust the mobility-related parameters of the aerial user terminal based on the location information, thereby improving performance of mobility management for the aerial user terminal.

A method for reporting location information performed by a user equipment according to the second embodiment of the present disclosure will be described below with reference to FIG. 5. This method corresponds to the method described with reference to FIG. 4, and many details thereof have been described above in accordance with FIG. 4, and thus, description of the same details is omitted herein to avoid repetition. Furthermore, as described above, the user equipment may be an aerial user terminal or a terrestrial user terminal. Herein, an aerial user terminal is taken as an example for description, and the description is also applicable to a terrestrial user terminal.

Figure 5:
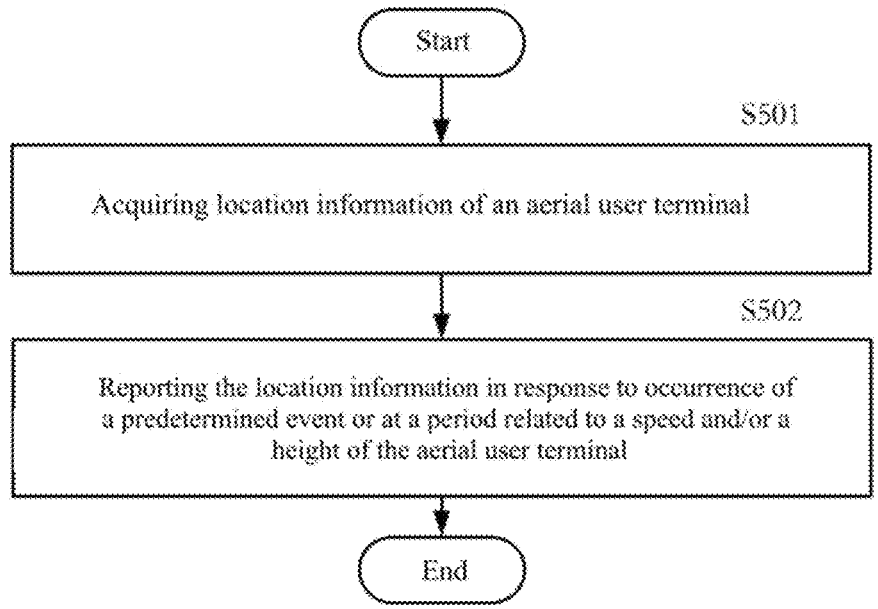
FIG. 5 is a flowchart of a method for reporting location information performed by a user equipment according to the second embodiment of the present disclosure.

Referring to FIG. 5, in step S501, location information of an aerial user terminal is acquired. The location information may be acquired in a manner known in the art, which will not be repeatedly described herein.

Next, in step S502, the location information is reported in response to occurrence of a predetermined event or at a period related to a speed and/or a height of the aerial user terminal.

As described above, in a first implementation, the location information is reported in response to the occurrence of the predetermined event. The predetermined event may be any suitable condition determined as needed.

In one example, the predetermined event may be defined based on the speed of the aerial user terminal. For example, the above event X1 or X2 may be defined such that when the event X1 or X2 occurs, the report of the location information may be triggered.

In another example, the predetermined event may be defined based on the height of the aerial user terminal. For example, the above event Y1 or Y2 may be defined such that when the event Y1 or Y2 occurs, the report of the location information may be triggered.

In another example, the predetermined event may be defined based on both the speed and the height of the aerial user terminal. For example, the above event Z1 or Z2 may be defined such that when the event Z1 or Z2 occurs, the report of the location information may be triggered.

In another example, the predetermined event may be defined based on the speed and the height of the aerial user terminal respectively, such that when both the predetermined event based on the speed and the predetermined event based on the height occur, the report of the location information may be triggered. For example, the predetermined event defined based on the speed may be the above event X1, and the predetermined event defined based on the height may be the above event Y1, such that when both the events X1 and Y1 occur, the report of the location information may be triggered. It should be appreciated that the above respective thresholds and hysteresis values may be set to be the same or different.

In another example, the predetermined event is defined based on the number of cells in which an event related to Radio Resource Management (RRM) measurement is triggered within a predetermined period of time. For example, the above event Xx may be defined such that if the number of cells in which the event related to RRM measurement is triggered within the predetermined period of time is greater than N, the event Xx occurs, and at this time, the report of the location information may be triggered.

In a second implementation, the aerial user terminal reports the location information at a period related to the speed and/or the height of the aerial user terminal. For example, the period may be set such that the greater the speed of the aerial user terminal, the shorter the period. Alternatively, the period may be set such that the higher the height of the aerial user terminal, the shorter the period.

Furthermore, as described above, the location information may be reported separately. Specifically, the aerial user terminal may receive configuration information only for the location information report transmitted by a base station, where the configuration information may include the measurement object, the measurement ID, and the report configuration for the location information as described above. The report configuration may include a trigger type (periodic or event-triggered) for the location information report and a format (i.e., content contained in the location information report) of the location information report. When the trigger type for the location information report is periodically triggered, the aerial user terminal may transmit the location information to the base station at the period as described above. When the trigger type for the report is event-triggered, the aerial user terminal may transmit the location information to the base station in the manner as described above when the predetermined event occurs.

Alternatively, the location information may be reported together with a RRM measurement report. As described above, content related to the location report in the report configuration of the LTE system may be modified, such that the report configuration further includes a trigger type (periodic or event-triggered) for the location information report and a format (i.e., content contained in the location information report) of the location information report. The aerial user terminal may receive the information, and when the trigger type for the information report is periodically triggered, the aerial user terminal may transmit the location information to the base station together with the RRM measurement report at the period as described above; when the trigger type for the report is event-triggered, the aerial user terminal may transmit the location information to the base station together with the RRM measurement report in the manner as described above when the predetermined event occurs.

Therefore, the aerial user terminal may transmit the location information to the base station in time, such that the base station may set the mobility-related parameters of the aerial user terminal more reasonably, thereby improving performance of mobility management for the aerial user terminal.

A base station according to the second embodiment of the present disclosure will be described below with reference to FIG. 6.

Figure 6:
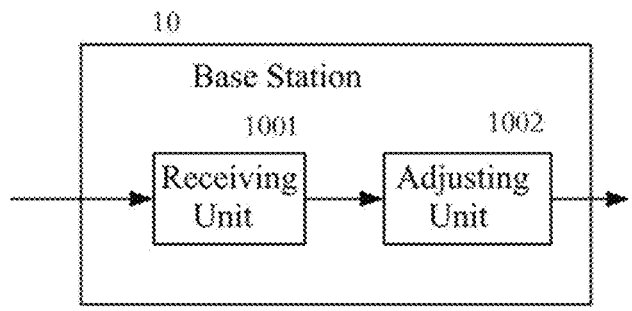
FIG. 6 is a block diagram of a base station according to the second embodiment of the present disclosure.

As shown in FIG. 6, the base station 10 comprises a receiving unit 1001 and an adjusting unit 1002. It should be noted that although only two units of the base station 10 are shown in FIG. 6, this is only schematic, and the base station 10 may further comprise one or more other units, which are omitted because they are not related to the inventive concept.

The receiving unit 1001 may receive location information reported by an aerial user terminal. As described above, the location information reported by the aerial user terminal may include one or more of location coordinates of the aerial user terminal 20 (including a height), a speed of the aerial user terminal 20, a valid time (Gnss-Tod-msec) of the location information, and the like, or may include any other information related to the location of the aerial user terminal 20.

In a first implementation, the location information is reported by the aerial user terminal 20 in response to occurrence of a predetermined event. The predetermined event may be any suitable condition determined as needed.

In one example, the predetermined event may be defined based on the speed of the aerial user terminal. For example, the above event X1 or X2 may be defined such that when the event X1 or X2 occurs, the report of the location information may be triggered.

In another example, the predetermined event may be defined based on the height of the aerial user terminal. For example, the above event Y1 or Y2 may be defined such that when the event Y1 or Y2 occurs, the report of the location information may be triggered.

In another example, the predetermined event may be defined based on both the speed and the height of the aerial user terminal. For example, the above event Z1 or Z2 may be defined such that when the event Z1 or Z2 occurs, the report of the location information may be triggered.

In another example, the predetermined event may be defined based on the speed and the height of the aerial user terminal respectively, such that when both the predetermined event based on the speed and the predetermined event based on the height occur, the report of the location information may be triggered. For example, the predetermined event defined based on the speed may be the above event X1, and the predetermined event defined based on the height may be the above event Y1, such that when both the events X1 and Y1 occur, the report of the location information may be triggered. It should be appreciated that the above respective thresholds and hysteresis values may be set to be the same or different.

In another example, the predetermined event is defined based on the number of cells that trigger an event related to Radio Resource Management (RRM) measurement within a predetermined period of time.

Specifically, as described above, a plurality of events related to RRM measurement are defined in the LTE system, such as the events A1-A6 and the like. For example, a new event Xx may be defined such that if the number of cells that trigger the event related to RRM measurement within the predetermined period of time is greater than N, the event Xx occurs, and at this time, the report of the location information may be triggered.

In a second implementation, the location information is reported by the aerial user terminal at a period related to the speed and/or the height of the aerial user terminal. For example, as described above, the aerial user terminal may adjust, according to its own speed and/or height, a reporting period by using a scaling factor based on a fixed period configured by the base station, or set a reporting period (instead of a fixed period configured by the base station) according to its own speed and/or height, and report the location information at the adjusted or set period. For example, the aerial user terminal may adjust or set the period such that the greater the speed of the aerial user terminal, or the greater the speed variation over a period of time, the shorter the period. Alternatively, the period may be set such that the higher the height of the aerial user terminal, or the greater the height variation over a period of time, the shorter the period.

Furthermore, as described above, the location information may be reported separately, or may be reported together with a RRM measurement report, details of which are the same as those described above with referent to FIG. 4, and will not be repeatedly described herein.

Referring to FIG. 6 again, the adjusting unit 1002 may adjust the mobility-related parameters of the aerial user terminal according to the location information. Specifically, the adjustment unit 1002 may adjust the mobility-related parameters of the aerial user terminal according to the location information in any suitable manner. For example, the adjustment unit 1002 may adjust (scale) the mobility-related parameters according to the height and speed information in the location information by using the method for adjusting the mobility-related parameters according to the first embodiment of the present disclosure, which will not be repeatedly described herein. Alternatively, the adjusting unit 1002 may adjust the mobility-related parameters of the aerial user terminal according to the location information in a manner known in the art.

Therefore, the base station may obtain the location information of the aerial user terminal in time, and adjust the mobility-related parameters of the aerial user terminal based on the location information, thereby improving performance of mobility management for the aerial user terminal.

A user equipment according to the second embodiment of the present disclosure will be described below with reference to FIG. 7. The user equipment may be an aerial user terminal or a terrestrial user terminal. Herein, an aerial user terminal is used as an example for description, but the description is also applicable to a terrestrial user terminal.

Figure 7:
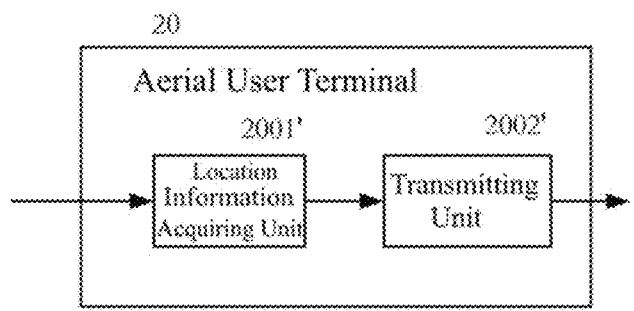
FIG. 7 is a block diagram of a user equipment according to the second embodiment of the present disclosure.

As shown in FIG. 7, the aerial user terminal 20 comprises a location information acquiring unit 2001' and a transmitting unit 2002'. It should be noted that although only two units of the aerial user terminal 20 are shown in FIG. 7, this is only schematic, and the aerial user terminal 20 may further comprise one or more other units, which are omitted because they are not related to the inventive concept.

The location information acquiring unit 2001' acquires location information of an aerial user terminal. The location information may be acquired in a manner known in the art, which will not be repeatedly described herein.

The transmitting unit 2002' report the location information in response to occurrence of a predetermined event or at a period related to a speed and/or a height of the aerial user terminal.

As described above, in a first implementation, the transmitting unit 2002' reports the location information in response to the occurrence of the predetermined event. The predetermined event may be any suitable condition determined as needed.

In one example, the predetermined event may be defined based on the speed of the aerial user terminal. For example, the above event X1 or X2 may be defined such that when the event X1 or X2 occurs, the report of the location information may be triggered.

In another example, the predetermined event may be defined based on the height of the aerial user terminal. For example, the above event Y1 or Y2 may be defined such that when the event Y1 or Y2 occurs, the report of the location information may be triggered.

In another example, the predetermined event may be defined based on both the speed and the height of the aerial user terminal. For example, the above event Z1 or Z2 may be defined such that when the event Z1 or Z2 occurs, the report of the location information may be triggered.

In another example, the predetermined event may be defined based on the speed and the height of the aerial user terminal respectively, such that when both the predetermined event based on the speed and the predetermined event based on the height occur, the report of the location information may be triggered. For example, the predetermined event defined based on the speed may be the above event X1, and the predetermined event defined based on the height may be the above event Y1, such that when both the events X1 and Y1 occur, the report of the location information may be triggered. It should be appreciated that the above respective thresholds and hysteresis values may be set to be the same or different.

In another example, the predetermined event is defined based on the number of cells in which an event related to RRM measurement is triggered within a predetermined period of time. For example, the above event Xx may be defined such that if the number of cells in which the event related to RRM measurement is triggered within the predetermined period of time is greater than N, the event Xx occurs, and at this time, the report of the location information may be triggered.

In a second implementation, the transmitting unit 2002' reports the location information at a period related to the speed and/or the height of the aerial user terminal. For example, as described above, the transmitting unit 2002' may adjust, according to the speed and/or the height of the aerial user terminal, a reporting period by using a scaling factor based on a fixed period configured by the base station, or set a reporting period (instead of a fixed period configured by the base station) according to the speed and/or the height of the aerial user terminal, and report the location information at the adjusted or set period. For example, the transmitting unit 2002' may adjust or set the period such that the greater the speed of the aerial user terminal, or the greater the speed variation over a period of time, the shorter the period. Alternatively, the transmitting unit 2002' may set the period such that the higher the height of the aerial user terminal, or the greater the height variation over a period of time, the shorter the period.

Furthermore, as described above, the transmitting unit 2002' may report the location information separately. Specifically, the aerial user terminal may receive (for example, by a receiving unit that is not shown) configuration information only for the location information report transmitted by a base station, where the configuration information may include the measurement object, the measurement ID, and the report configuration for the location information as described above. The report configuration may include a trigger type (periodic or event-triggered) for the location information report and a format (i.e., content contained in the location information report) for the location information report. When the trigger type for the location information report is periodically triggered, the transmitting unit 2002' may transmit the location information to the base station at the period as described above. When the trigger type for the report is event-triggered, the transmitting unit 2002' may transmit the location information to the base station in the manner as described above when the predetermined event occurs.

Alternatively, the transmitting unit 2002' may report the location information together with a RRM measurement report. As described above, the base station may modify content related to the location report in the report configuration of the LTE system, such that the report configuration further includes a trigger type (periodic or event-triggered) for the location information report and a format (i.e., content contained in the location information report) of the location information report. The aerial user terminal may receive (for example, by a receiving unit) the information, and when the trigger type for the information report is periodically triggered, the transmitting unit 2002' may transmit the location information to the base station together with the RRM measurement report at the period as as described above; when the trigger type for the report is event-triggered, the transmitting unit 2002' may transmit the location information to the base station together with the RRM measurement report in the manner as described above when the predetermined event occurs.

Therefore, the aerial user terminal may transmit the location information to the base station in time, such that the base station may set the mobility-related parameters of the aerial user terminal more reasonably, thereby improving performance of mobility management for the aerial user terminal.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 8:
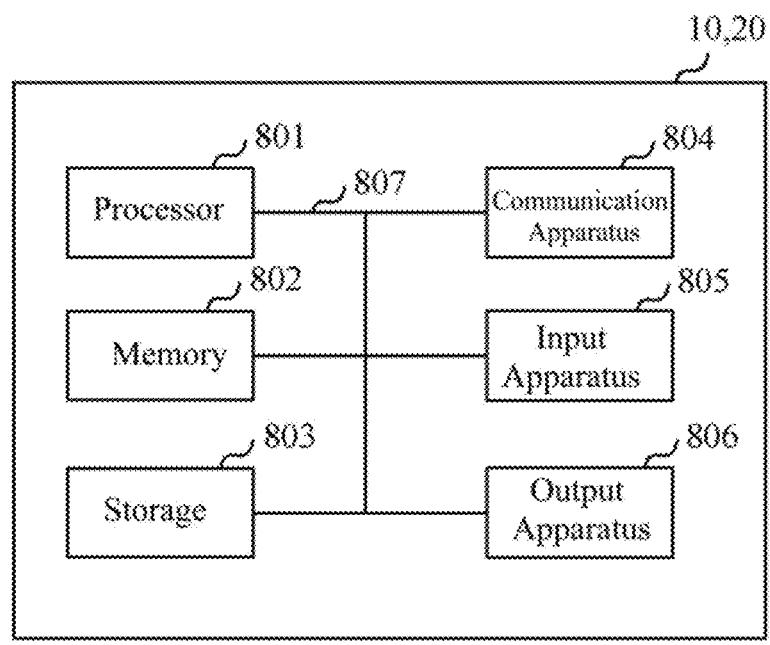
FIG. 8 is a diagram illustrating an example of a hardware structure of a wireless base station and a user terminal according to the present disclosure.

For example, the base station, the user terminal and the like in one embodiment of the present disclosure may function as a computer that executes the processes of the wireless communication method of the present disclosure. FIG. 8 is a diagram illustrating an example of a hardware structure of a wireless base station and a user terminal involved in one embodiment of the present disclosure. The wireless base station 10 and the user terminal 20 described above may be constituted as a computer apparatus that physically comprises a processor 801, a memory 802, a storage 803, a communication apparatus 804, an input apparatus 805, an output apparatus 806, a bus 807 and the like In addition, in the following description, terms such as "apparatus" may be replaced with circuits, devices, units, and the like. The hardware structure of the wireless base station 10 and the user terminal 20 may include one or more of the respective apparatuses shown in the figure, or may not include a part of the apparatuses.

For example, only one processor 801 is illustrated, but there may be a plurality of processors. Furthermore, processes may be performed by one processor, or processes may be performed by more than one processor simultaneously, sequentially, or by other methods. In addition, the processor 801 may be installed by more than one chip.

Respective functions of the wireless base station 10 and the user terminal 20 may be implemented, for example, by reading specified software (program) on hardware such as the processor 801 and the memory 802, so that the processor 801 performs computations, controls communication performed by the communication apparatus 804, and controls reading and/or writing of data in the memory 802 and the storage 803.

The processor 801, for example, operates an operating system to control the entire computer. The processor 801 may be constituted by a Central Processing Unit (CPU), which includes interfaces with peripheral apparatuses, a control apparatus, a computing apparatus, a register and the like. For example, the determining unit, the adjusting unit and the like described above may be implemented by the processor 801.

In addition, the processor 801 reads programs (program codes), software modules and data from the storage 803 and/or the communication apparatus 804 to the memory 802, and execute various processes according to them. As for the program, a program causing computers to execute at least a part of the operations described in the above embodiments may be employed. For example, the determining unit of the user terminal 20 may be implemented by a control program stored in the memory 802 and operated by the processor 801, and other functional blocks may also be implemented similarly.

The memory 802 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 802 may also be referred to as a register, a cache, a main memory (a main storage apparatus) and the like. The memory 802 may store executable programs (program codes), software modules and the like for implementing the method involved in one embodiment of the present disclosure.

The storage 803 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 803 may also be referred to as an auxiliary storage apparatus.

The communication apparatus 804 is a hardware (transceiver device) performing communication between computers via a wired and/or wireless network, and is also referred to as a network device, a network controller, a network card, a communication module and the like, for example. The communication apparatus 804 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 804.

The input apparatus 805 is an input device (e.g., a keyboard, a mouse, a microphone, a switch, a button, a sensor and the like) that receives input from the outside. The output apparatus 806 is an output device (e.g., a display, a speaker, a Light Emitting Diode (LED) light and the like) that performs outputting to the outside. In addition, the input apparatus 805 and the output apparatus 806 may also be an integrated structure (e.g., a touch screen).

Furthermore, the respective apparatuses such as the processor 801 and the memory 802 are connected by the bus 807 that communicates information. The bus 807 may be constituted by a single bus or by different buses between the apparatuses.

Furthermore, the wireless base station 10 and the user terminal 20 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 801 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the above wireless base station 10 may be regarded as functions provided by the user terminal 20. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal 20 may be regarded as functions provided by the wireless base station 10.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal capable of aerial communication, comprising:
   a transmitter that transmits a measurement report to a base station; and
   a processor that controls the transmission of the measurement report according to whether or not an event defined based on a height of the terminal occurs,
   wherein the processor triggers the transmission of the measurement report in a case that a trigger type of the measurement report is event-triggered and the event occurs, and
   wherein an occurrence condition for the event is that a difference between the height of the terminal and a hysteresis value is greater than a height threshold.

2. The terminal of claim 1, wherein:
   the occurrence condition for the event is that a sum of the height of the terminal and a hysteresis value is less than a height threshold.

3. The terminal of claim 1, wherein:
   location information of the terminal is included in the measurement report, and the location information includes a horizontal speed and a vertical speed of the terminal.

4. The terminal of claim 1, wherein:
   the processor further controls the transmission of the measurement report according to a number of cells in which an event related to Radio Resource Management (RRM) measurement is triggered within a predetermined period of time.

5. The terminal of claim 4, wherein:
   the processor triggers the transmission of the measurement report in a case that the number of the cells is above a preset threshold.

6. A wireless communication method for a terminal capable of aerial communication, the wireless communication method comprising:
   transmitting a measurement report to a base station;
   controlling the transmission of the measurement report according to whether or not an event defined based on a height of the terminal occurs,
   wherein the terminal triggers the transmission of the measurement report in a case that a trigger type of the measurement report is event-triggered and the event occurs, and
   wherein an occurrence condition for the event is that a difference between the height of the terminal and a hysteresis value is greater than a height threshold.

* * * * *